(12) United States Patent
Stangl

(10) Patent No.: US 12,117,357 B2
(45) Date of Patent: Oct. 15, 2024

(54) METHOD FOR DETERMINING THE CLAMPING FORCE

(71) Applicant: Roehm GmbH, Sontheim/ Brenz (DE)

(72) Inventor: Martin Stangl, Nersingen (DE)

(73) Assignee: Roehm GmbH, Sontheim/Brenz (DE)

( * ) Notice: Subject to any disclaimer, the term of this patent is extended or adjusted under 35 U.S.C. 154(b) by 338 days.

(21) Appl. No.: 17/484,733

(22) Filed: Sep. 24, 2021

(65) Prior Publication Data

US 2022/0011183 A1    Jan. 13, 2022

Related U.S. Application Data

(63) Continuation of application No. PCT/EP2020/057587, filed on Mar. 19, 2020.

(30) Foreign Application Priority Data

Mar. 26, 2019    (DE) ................... 10 2019 107 711.7

(51) Int. Cl.
*G01L 5/00* (2006.01)
*G08C 17/02* (2006.01)
*H04Q 9/00* (2006.01)

(52) U.S. Cl.
CPC ............ *G01L 5/0061* (2013.01); *G08C 17/02* (2013.01); *H04Q 9/00* (2013.01); *H04Q 2209/40* (2013.01)

(58) Field of Classification Search
CPC ........ G01L 5/0061; G08C 17/02; H04Q 9/00; H04Q 2209/40; B23B 2231/26; B23B 2260/128; B23B 31/1627; B23Q 17/005
See application file for complete search history.

(56) References Cited

U.S. PATENT DOCUMENTS 4,781,390 A * 11/1988 Steinberger .............. B23Q 3/16
279/4.02
10,493,575 B2    12/2019 Hediger
(Continued)

FOREIGN PATENT DOCUMENTS

| CA | 3056449 A1 * | 11/2018 | ......... B29C 45/7653 |
| CN | 1524658 A * | 9/2004 | ............. B25B 1/103 |

(Continued)

*Primary Examiner* — Eyob Hagos
(74) *Attorney, Agent, or Firm* — Muncy, Geissler, Olds & Lowe, P.C.

(57) ABSTRACT

A method for determining the clamping force of a force-actuated, rotationally drivable clamping device of a machine tool. An object is clamped with an actuation force F. Model-based calculation of the clamping force $F_{calc}$ to be expected is performed based on the actuation force F and the operating parameters of the machine tool in a control unit of the machine tool. Performing clocked measurement of the clamping force $F_{real}$ acting upon the object in the clamping device within the time span of a measurement interval I. Wireless transming the measured value $F_{real}$ to the control unit of the machine tool, and comparison of the measured value $F_{real}$ with the calculated clamping force $F_{calc}$. The measurement interval is adapted if the comparison reveals a deviation which reaches a threshold value.

10 Claims, 1 Drawing Sheet

(56) References Cited

U.S. PATENT DOCUMENTS

| | | | |
|---|---|---|---|
| 2001/0026028 A1* | 10/2001 | Nakamoto | B29C 45/7653 |
| | | | 425/593 |
| 2009/0096177 A1* | 4/2009 | Rohm | B23Q 3/152 |
| | | | 279/121 |
| 2011/0006490 A1* | 1/2011 | Puppala | B23B 31/19 |
| | | | 279/134 |
| 2013/0147133 A1 | 6/2013 | Kaleja | |
| 2016/0193665 A1* | 7/2016 | Hiestand | B23Q 3/12 |
| | | | 279/126 |
| 2020/0003642 A1* | 1/2020 | Ivenz | H04Q 9/02 |

FOREIGN PATENT DOCUMENTS

| | | | | |
|---|---|---|---|---|
| DE | 10 2010 039 608 A1 | 1/2012 | | |
| DE | 10 2011 081 122 A1 | 2/2013 | | |
| EP | 0 213 218 A1 | 3/1987 | | |
| JP | 2000071039 A | 3/2000 | | |
| JP | 2001277073 A | 10/2001 | | |
| JP | 2004034187 A1 | 2/2004 | | |
| JP | 2017127911 A | 7/2017 | | |
| JP | 2018183863 A | 11/2018 | | |
| JP | 2022147075 A * | 10/2022 | | |
| WO | WO-2011038730 A1 * | 4/2011 | | B23B 31/28 |
| WO | WO-2013024457 A1 * | 2/2013 | | B23B 31/162 |

* cited by examiner

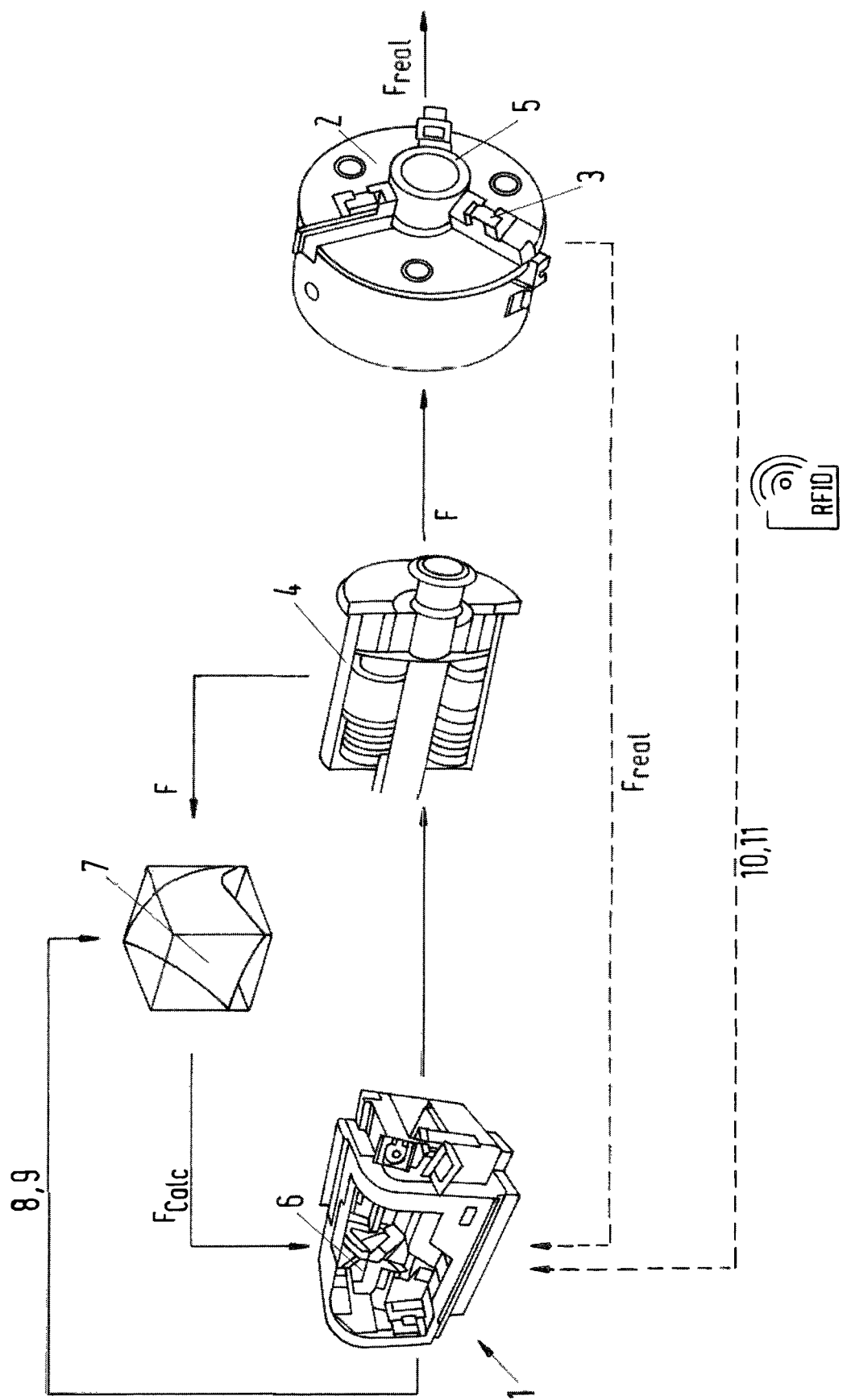

METHOD FOR DETERMINING THE CLAMPING FORCE

This nonprovisional application is a continuation of International Application No. PCT/EP2020/057587, which was filed on Mar. 19, 2020, and which claims priority to German Patent Application No. 10 2019 107 711.7, which was filed in Germany on Mar. 26, 2019, and which are both herein incorporated by reference.

BACKGROUND OF THE INVENTION

Field of the Invention

The present invention relates to a method for determining the clamping force of a force-actuated, rotationally drivable clamping device of a machine tool, comprising the steps: Clamping of an object with an actuation force F; Model-based calculation of the clamping force $F_{calc}$ to be expected based on the actuation force F and the operating parameters of the machine tool in a control unit of the machine tool; Clocked measurement of the clamping force $F_{real}$ acting upon the object in the clamping device within the time span of a measurement interval I; Wireless transmission of the measured value $F_{real}$ to the control unit of the machine tool, and comparison of the measured value $F_{real}$ with the calculated clamping force $F_{calc}$; and Adaptation of the measurement interval if the comparison reveals a deviation which reaches a threshold value.

Description of the Background Art

To safely operate machine tools with the clamping devices assigned to them, it is necessary to know the clamping force at which a workpiece or a tool is clamped into the clamping device. This finding resulted in the Machinery Directive 2006/42/EC, which requires a certain safety level of the functional safety for operation, it being necessary, to some extent, to redundantly provide safety-relevant signals.

The direct measurement of the clamping force of the clamping device is desirable, the use thereof in a machine tool meaning that the clamping device is generally formed by a chuck having clamping jaws, in which the clamp-in forces measured at the clamping jaws must be transmitted from a rotating system to the machine tool. Wireless data transmission is useful for this purpose, which means, however, that energy must be provided in the rotating system for the measured value detection and the wireless transmission of the measured value.

A clamping apparatus is described in DE 10 2011 081 122 B4, which includes a chuck body having at least one clamping element and a measuring device for detecting a clamping force applied by the clamping element onto the workpiece clamped in the workpiece clamping device, the measuring device being provided at a top jaw, which also has an evaluation unit. An actuating device is also present for applying a desired clamping force onto a workpiece clamped in the workpiece clamping device. A comparison between the defined necessary setpoint clamping force and the clamping force detected by the measuring device takes place in the evaluation device.

SUMMARY OF THE INVENTION

It is therefore an object of the present invention to reduce the energy demand necessary in the rotationally drivable clamping device while ensuring a necessary safety level.

This object is achieved in an exemplary embodiment by the method described at the outset, which is characterized in that the given clamping force is determined in two ways, namely by the model-based calculation, the clamping force to be expected based on the actuation force and the operating parameters of the machine tool, and the direct measurement of the clamping force. The direct measurement of the clamping force does not take place continuously but in a clocked manner within the time span of a measurement interval. The duration of the measurement interval is not uniformly predefined but, to save energy, may increased with respect to the detection of the measured value to obtain a good correspondence between the calculated clamping force to be expected and the clamping force actually measured. In addition, to guarantee the necessary safety level, a shortening of the measurement interval may also take place if the model-based calculation of the clamping force reveals an excessively high value, and individual operating parameters are thus insufficiently determined and require a correction. Operating parameters of this type result from the force transmission chain upon the generation of the actuation force, which is converted into a clamping force via a mechanical transmission. The mechanical transmission ratio is primarily dependent on angle or lever ratios of the clamping mechanism. Further operating parameters are the rotational speed of the clamping device, including the resulting centrifugal force, as well as the friction coefficient of the functional surfaces of the transmission mechanism, which are influenced by tribological effects, such as wear or the lubrication condition.

In the manner provided by the method, it is possible to safeguard the wireless data transmission, which alone does not meet the requirements of the functional safety of the machinery directive, by the model-based calculation of the clamping force to be expected and, to adapt the measurement interval based on the validity of the clamping force to be expected for the purpose of optimized energy consumption.

For the purpose of an improved safety, it is provided for the method that the measurement interval is lengthened if the threshold value is not reached, and/or the measurement interface is shortened if the threshold value is exceeded. With the aid of an optimization with respect to the energy consumption, this guarantees that the model-based calculation of the clamping force to be expected sufficiently precisely reflects the actually existing clamping force to guarantee the necessary safety level.

Again with respect to a guarantee of a sufficient safety level, it is provided that the size of the change of the measurement interval is proportionate to the distance of the measured value $F_{real}$ from the threshold value, i.e. a correspondingly dramatic change of the measurement interval takes place at a great distance from the threshold value. The possibility also exists that the threshold value for a deviation where $F_{real}$ is less than $F_{calc}$ is less than/equal to a threshold for a deviation where $F_{real}$ is greater than $F_{calc}$, i.e. different threshold values are used with respect to the necessary degree of safety and, in particular the case that the actual clamping force is less than the calculated clamping force is more closely monitored, since this represents a greater risk potential.

However, it make also be taken into account that the deformation sensitivity of the object to be clamped is considered during the definition of the threshold value for a deviation where $F_{real}$ is greater than $F_{calc}$, i.e. deformationsensitive workpieces, for example thin-walled sleeves, are also protected against being damaged by an actually excessively high clamping force.

It has proven to be advantageous if the threshold value lies at a deviation of less than/equal to 2%, in particular a deviation of 1.5% and preferably a deviation of 0.5%.

It is furthermore advantageous if a sensor is present for detecting the actuation force, whose measured data may be transmitted in a wirebound manner to the control unit. In this method, two separate sensors are available, which detect the active force in different locations of the force transmission chain and represent a significant increase in safety due to the merging of two items of sensor data via redundant transmission paths.

In the case that the clamping device is formed by a chuck, the sensor for measuring the clamping force $F_{real}$ is preferably assigned to one of the clamping jaws.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a schematic representation of the procedures for determining the clamping force with the necessary safety level.

DETAILED DESCRIPTION

The FIGURE shows a machine tool 1, to which a chuck is assigned as a clamping device, in the illustrated exemplary embodiment namely a three-jaw chuck having three clamping jaws 3, which are arranged evenly over the circumference and adjustable radially with respect to the chuck axis, whose adjustment in the illustrated exemplary embodiment takes place via an electrical drive 4, via which an actuation force F is provided. This actuation force is converted by mechanical transmission in the force transmission chain to a clamping force, which is applied by clamping jaws 3 onto workpiece 5, which in the illustrated exemplary embodiment is a sleeve held under external tension. The clamping force stemming from actuation force F is further influenced by the centrifugal force during the rotational actuation of the clamping device, by the design and quality of the functional surfaces of clamping jaws 3 as well as by the wear and lubrication condition thereof. From clamping force F, a model-based calculation of clamping force $F_{calc}$ to be expected based on the actuation force F and the operating parameters of machine tool 1 then takes place in a control unit 6 of machine tool 1. Moreover, a clocked measurement of clamping force $F_{real}$ acting upon the object in the clamping device takes place within the time span of a measurement interval, as does the wireless transmission of measured value $F_{real}$ to control unit 6 of machine tool 1, in which a comparison of measured value $F_{real}$ with calculated clamping force $F_{calc}$ occurs.

An adaptation of the measurement interval takes place if the comparison results in a deviation which reaches a threshold value, the measurement interval being lengthened if the threshold value is not reached, and the measurement interval is shortened if the threshold value is exceeded, so that the radio signal for the wireless transmission of measured value $F_{real}$ must be transmitted less often upon a good correspondence, whereby the lifespan of the rechargeable battery integrated into clamping jaw 3 for providing the necessary electrical energy is significantly prolonged. During the transmission pauses between the transmission of measured values $F_{real}$, the clamping force is calculated according to a model 7, based on actuation force F and additional measured variables, such as rotational speed 8 of the machine spindle, mass 10 of the jaws, accumulated number of cycles 11 and other definitive parameters 9, such as wear and lubrication condition.

It should be noted that the threshold value for a deviation where $F_{real}$ is less than $F_{calc}$ does not have to be identical to the threshold value for a deviation where $F_{real}$ is greater than $F_{calc}$ and, in particular, may be selected to be lower. The deformation sensitivity of workpiece 5 clamped or to be clamped may also be taken into account in defining the threshold value. Finally, it should be noted that actuation force F may not only be derived from the generated actuation force but may also be controlled with the aid of a sensor, whose measured data is transmitted in a wirebound manner to control unit 6. Two different sensors are thus available, which transmit their measured data to control unit 6 on different paths for the redundant control of the clamping state.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a clamping force of a force actuated, rotationally drivable clamping device of a machine tool, the method comprising:
    clamping an object with an actuation force, the actuation force being measured by a sensor;
    model-based calculating the clamping force to be expected based on the actuation force and operating parameters of the machine tool in a control device of the machine tool;
    clocked measuring the clamping force acting upon the object in the clamping device, by directly measuring the clamping force, within a time span of a measurement interval;
    wirelessly transmitting the measured value of the clamping force to the control device of the machine tool;
    comparing the measured value with the calculated clamping force;
    adapting the measurement interval when the comparison reveals a deviation which reaches a threshold value; and
    adjusting the operating parameters of the clamping device when the calculated clamping force deviates from the measure value.

2. The method according to claim 1, wherein the measurement interval is lengthened when the threshold value is not reached, and/or the measurement interval is shortened when the threshold value is exceeded.

3. The method according to claim 1, wherein a size of the change of the measurement interval is proportionate to a deviation of the measured value from the threshold value.

4. The method according to claim 1, wherein the threshold value for a deviation where the measured value is less than the calculated clamping force is less than or equal to the threshold value for a deviation where the measured value is greater than calculated clamping force.

5. The method according to claim 1, wherein the deformation sensitivity of the object to be clamped is taken into account in the definition of the threshold value for a deviation where measured value is greater than calculated clamping force.

6. The method according to claim 1, wherein the threshold value lies at a deviation of less than or equal to 2%.

7. The method according to claim 1, wherein the actuation force, measured by the sensor, is transmitted in a wirebound manner to the control device.

8. The method according to claim 1, wherein the clamping device is formed by a chuck, and the sensor for measuring the clamping force is assigned to one of the clamping jaws.

9. The method according to claim 1, wherein the threshold value lies at a deviation of 1.5%.

10. The method according to claim 1, wherein the threshold value lies at a deviation of 0.5%.

* * * * *